Mar. 3, 1925.

V. LANCIA

STEERING GEAR FOR VEHICLES

Filed Oct. 29, 1923

1,528,669

Inventor
V. Lancia
by Langner, Parry, Card
& Langner
Attys

Patented Mar. 3, 1925.

1,528,669

UNITED STATES PATENT OFFICE.

VINCENZO LANCIA, OF TURIN, ITALY.

STEERING GEAR FOR VEHICLES.

Application filed October 29, 1923. Serial No. 671,545.

*To all whom it may concern:*

Be it known that I, VINCENZO LANCIA, subject of the King of Italy, residing at Turin, Italy, have invented certain new and useful Improvements in Steering Gears for Vehicles, of which the following is a specification.

The present invention relates to steering gears for motor cars and particularly for cars in which the sides of their front portion approach each other towards the front end of the vehicle.

The present invention has for its object a steering gear of said class comprising a steering arm driven by a steering pillar by means of a quadrant and worm gear, in which said arm is mounted to rotate in a plane parallel with the car side.

Figure 1:
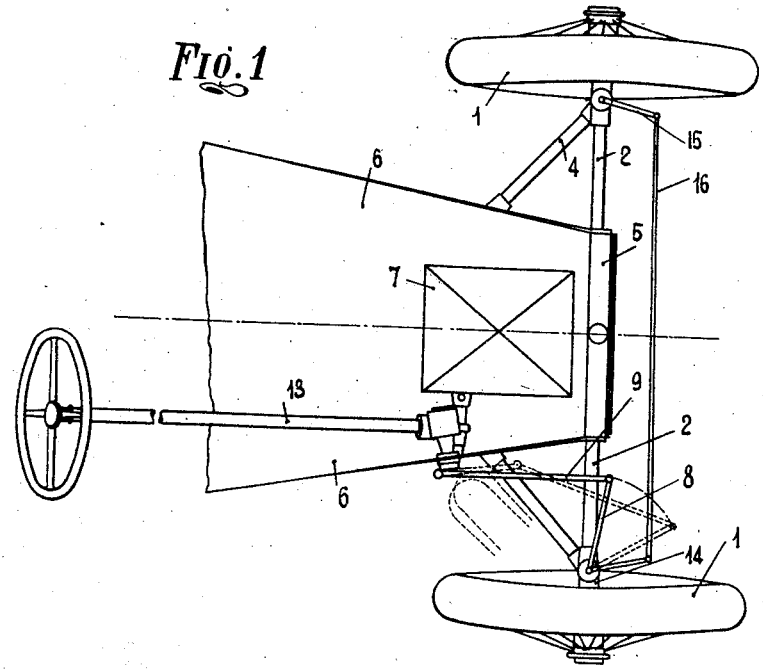
Figure 2:
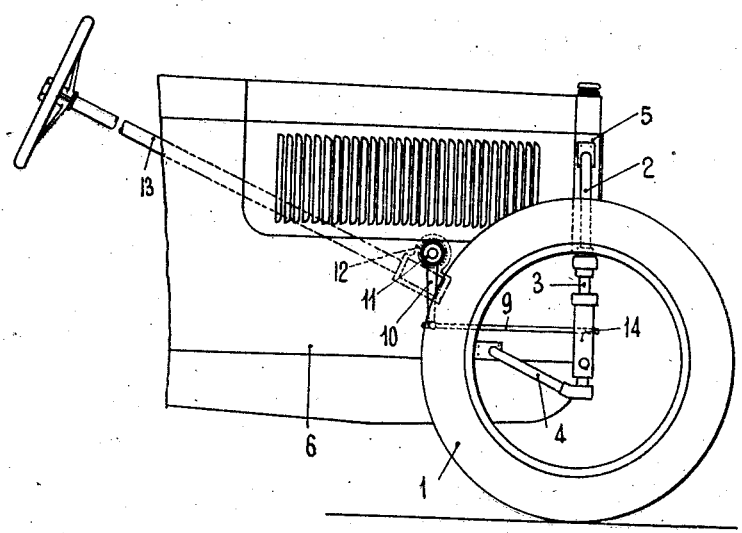

On the annexed drawing is shown by way of example an embodiment of the present invention in which Figure 1 is a fragmentary plan view of the front portion of a vehicle; and Figure 2 is a side view of the same.

In said figures, 1, 1 are the front wheels of the vehicle which are carried by a swivel member 14 pivotally supported in a structure comprising bars 2—3—4, said bars 2 being attached to a frame 5 supporting the engine radiator, while bars 4 are attached to the sides 6 of the vehicle body. Between the sides 6 is located the engine 7 and said sides converge each other as shown by Figure 1.

The steering gear comprises a pillar 13 driving a worm and a toothed quadrant enclosed in a box 12, in the well known manner, and a steering arm 10 which is solid with the shaft 11 of said quadrant and actuates a rod 9 and a lever gear comprising arms 15 solid swivel members 14 and a connecting rod 16.

According to the present invention the shaft 11 of said toothed quadrant and arm 10 is mounted rotate around an axis which is inclined with respect to the axis of the steering pillar 13; which pillar is rotatable around an axis which lies in a vertical plane parallel with the longitudinal axis of the car, as usual.

In the gear between the pillar 13 and rod 9, comprising a worm solid with said pillar and a toothed quadrant solid with the shaft 11, as above described, the teeth of this quadrant are suitably inclined for the purpose of meshing with the threads of the said worm whose axis is not at right angles with respect to the rotation axis of said quadrant as is usually found in known constructions.

With the described device when the arm 10 is rotated by the operation of the steering pillar 13, it moves at all times in a plane parallel with the adjacent side 6 of the vehicle body or structure and also the pivot point of said arm with said rod 9 always lies in such a plane. Therefore when the maximum steering angle is reached and the parts are in the dotted line position of Figure 1, a larger free space is allowed for the wheel deviation than in known constructions in which the shaft 11 has its axis perpendicular with respect to the central longitudinal axis of the vehicle and the arm 10 rocks in a vertical plane parallel with said longitudinal axis.

Said operation is clearly shown by Figure 1 where the parts are shown in full lines in their straight running position and in dotted lines in their fully steered position; and apparently the maximum permissible steering angle is obtained for the wheels.

What I claim as my invention and desire to secure by United States Letters Patent is:—

1. In a motor car comprising a front portion having sides approaching each other, a steering gear comprising, a steering pillar, a worm and a quadrant gear actuated by said pillar, a steering arm solid with said quadrant, and a rod and lever gear for imparting steering deviations to the wheels, said steering arm being mounted to rotate about an axis inclined with respect to a vertical plane parallel with the longitudinal central axis of the car, said axis of rotation of the steering arm being perpendicular to the adjacent vehicle side.

2. In a motor car comprising a front portion having sides approaching each other, a steering gear comprising a steering pillar, a worm and a quadrant gear actuated by said pillar, a steering arm solid with said quadrant, and a rod-and-lever gear for imparting steering deviations to the wheels, said pillar lying in a vertical plane parallel with the longitudinal central axis of the car, said quadrant having its axis perpendicular to the adjacent vehicle side, and said steering arm solid with said quadrant rocking in a plane parallel with the said adjacent vehicle side.

In testimony whereof I have signed my name to this specification.

VINCENZO LANCIA.